(12) United States Patent
Seid et al.

(10) Patent No.: US 7,909,721 B2
(45) Date of Patent: Mar. 22, 2011

(54) FLUID PRESSURE CONTROL ASSEMBLY

(75) Inventors: David L. Seid, Conklin, MI (US); Kevin Manthei, Marne, MI (US); Hamid Najmolhoda, Grand Rapids, MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 632 days.

(21) Appl. No.: 11/811,282

(22) Filed: Jun. 8, 2007

(65) Prior Publication Data

US 2008/0132381 A1 Jun. 5, 2008

Related U.S. Application Data

(60) Provisional application No. 60/812,683, filed on Jun. 9, 2006.

(51) Int. Cl.
*F16H 31/00* (2006.01)

(52) U.S. Cl. ........................................... 475/116

(58) Field of Classification Search .................. 475/116
See application file for complete search history.

(56) References Cited

U.S. PATENT DOCUMENTS

| | | | |
|---|---|---|---|
| 4,282,880 A * | 8/1981 | Gardineer et al. | 600/437 |
| 5,845,667 A | 12/1998 | Najmolhoda et al. | 137/1 |
| 6,059,067 A * | 5/2000 | Shibahata et al. | 180/338 |
| 6,199,587 B1 * | 3/2001 | Shlomi et al. | 137/625.5 |
| 6,544,138 B2 | 4/2003 | True et al. | 475/116 |
| 6,695,748 B2 | 2/2004 | Kopec et al. | 477/130 |
| 6,807,460 B2 * | 10/2004 | Black et al. | 700/244 |
| 6,830,527 B2 * | 12/2004 | Wakayama | 475/161 |
| 6,835,152 B2 * | 12/2004 | Itou et al. | 475/119 |
| 6,866,612 B2 * | 3/2005 | Tokura et al. | 477/176 |
| 7,086,308 B2 * | 8/2006 | Suzuki et al. | 74/606 R |
| 7,255,214 B2 * | 8/2007 | Long et al. | 192/85.01 |
| 7,384,358 B2 * | 6/2008 | Suzuki | 475/127 |

* cited by examiner

*Primary Examiner* — Ha D. Ho

(57) ABSTRACT

Assembly of multiple individual fluid pressure control solenoid valves and an individual fluid temperature sensor so packaged relative to a respective one of the individual solenoid valves as to permit direct or indirect fluid temperature measurement at individual solenoid valves. The assembly can include a lead-frame support (e.g. a printed circuit board) having multiple individual fluid pressure control solenoid valves and an individual transmission oil temperature sensor disposed on the lead-frame support in an oil passage that communicates to an output flow port of a respective one of the individual solenoid valves to provide transmission oil temperature information to a transmission electronic control unit, wherein the transmission electronic control unit provides command signals to the individual solenoid valves in response to the individual transmission oil temperature input signals associated with an individual solenoid valve to achieve more accurate pressure control.

14 Claims, 2 Drawing Sheets

FLUID PRESSURE CONTROL ASSEMBLY

This application claims priority and benefits of provisional application Ser. No. 60/812,683 filed Jun. 9, 2006.

FIELD OF THE INVENTION

The present invention relates to an assembly or module having fluid pressure control solenoid valves and a temperature sensor associated with each solenoid valve in a manner to improve fluid pressure control characteristics of the solenoid valves.

BACKGROUND OF THE INVENTION

Precision VBS (variable bleed solenoid) devices are commonly used to provide accurate hydraulic control of certain automatic transmission functions. For example, one industry standard function has involved regulating the main transmission supply pressure.

Fluid pressure to control respective clutches of an automatic transmission can be controlled using VBS devices. For example, several VBS devices have been mounted/packaged on a common control module assembly to provide advanced transmission clutch control logic as described, for example, in U.S. Pat. No. 6,695,748. This technology has required additional precision and repeatability of the VBS pressure control characteristics.

Traditionally, the VBS pressure control algorithm uses transmission oil temperature as a primary input to the control strategy (either a series of lookup tables or as a system model) to derive the output pressure control. In the past, a single common transmission oil temperature sensor (e.g. thermistor) has been used as the key input. The drawbacks to this approach are that the single thermistor is usually packaged away from at least some of the VBS devices of the transmission pressure control and that there is generally a significant temperature difference in the actual VBS internal temperature and the thermistor temperature. As a result, the system model accuracy is compromised. The condition is amplified if there are multiple VBS solenoids and if the arrangement of solenoids is exposed to varying transmission sump oil levels. These conditions cause varying thermal losses (convection) and subsequent changing and/or varying VBS temperatures. The internal solenoid temperatures vary due to oil levels, solenoid duty cycle and the like and render precise modeling difficult to attain. That is, the average remote measurement of the single thermistor yields a temperature difference from the actual solenoid temperatures involved, and the temperature difference varies by solenoid positions and/or oil level such that resultant modeled pressure control inaccuracies are experienced.

SUMMARY OF THE INVENTION

In an illustrative embodiment, the present invention provides an assembly or module having multiple individual fluid pressure control solenoid valves and having an individual fluid temperature sensor so disposed relative to a respective one of the individual solenoid valves as to permit fluid temperature measurement at an individual solenoid valve to provide more accurate fluid pressure control. The invention compensates for local fluid temperature variations among the solenoid valves.

In a particular illustrative embodiment, the present invention provides an assembly that includes a lead-frame support (e.g. a printed circuit board) having multiple individual fluid pressure control solenoid valves and an individual transmission oil temperature sensor, such as preferably a thermistor, packaged on the lead-frame support proximate the output fluid flow port of a respective one of the individual solenoid valves to provide transmission oil temperature information at that solenoid valve to a transmission electronic control unit, which can be mounted directly on the lead-frame support or separately therefrom on the transmission housing for example. The temperature sensor preferably is disposed in an oil passage communicated to an output fluid flow port such as an exhaust port or control port, so that transmission oil flows over the sensor to directly measure its temperature, although the sensor can be disposed external of an oil passage, such as on an oil tube or conduit, to indirectly measure oil temperature. The transmission electronic control unit can provide a command signal to the individual solenoid valves in response to the individual oil temperature input information associated with that individual solenoid valve to achieve more accurate pressure control by that solenoid valve.

The above and other advantages of the present invention will become more apparent from the following detailed description taken with the following drawings.

DETAILED DESCRIPTION OF THE INVENTION

The present invention will be described herebelow with respect to an illustrative embodiment for use with an electronic transmission control unit ETCU that controls multiple clutches of a vehicle automatic transmission, although the invention is not limited to this particular illustrative vehicle automatic transmission application and can be used to improve accuracy of fluid pressure control by multiple fluid pressure control valves in a manner that accommodates any local temperature variations among the solenoid valves.

Figure 1:
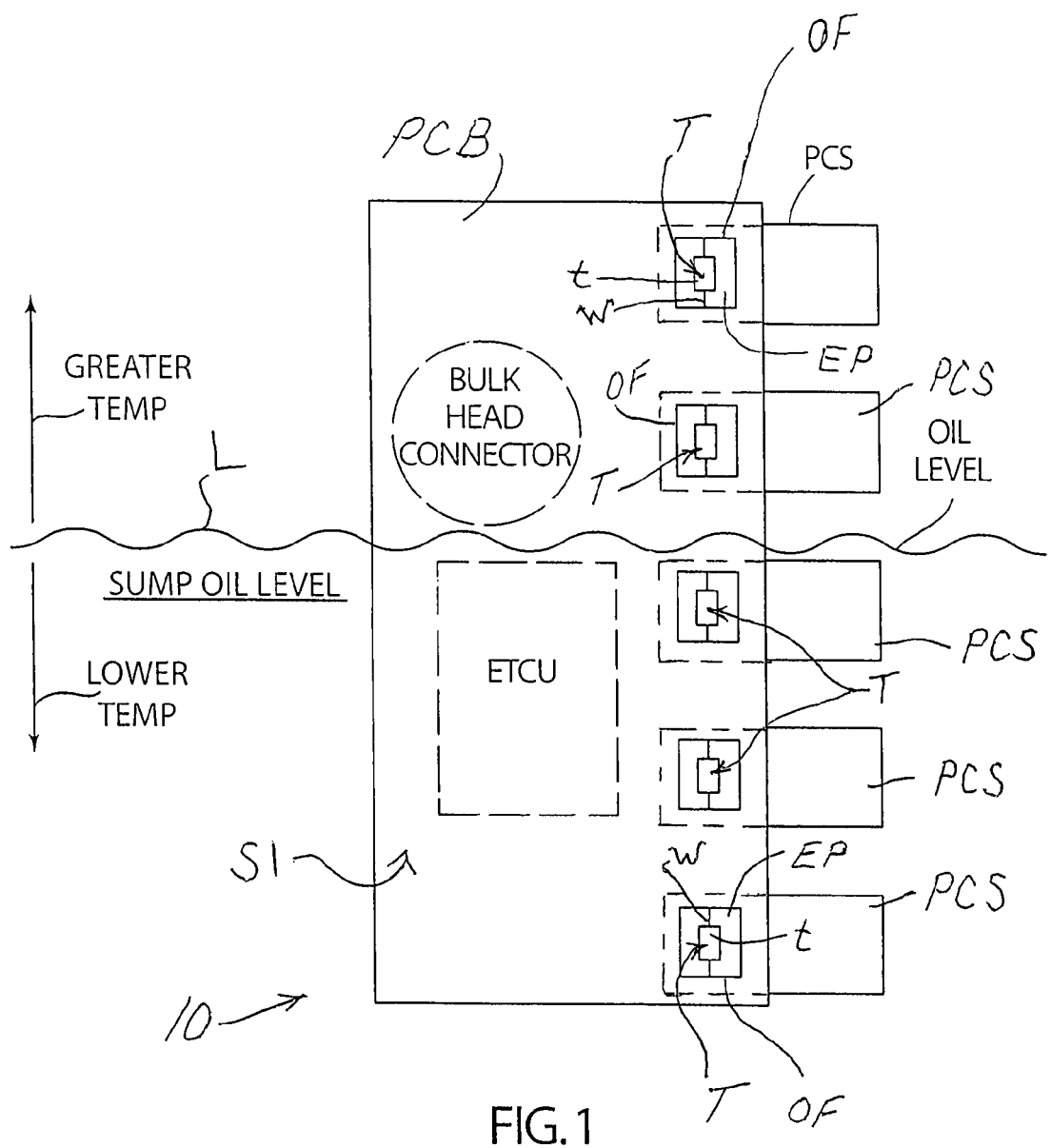
FIG. 1 is a schematic view of one side of a lead-frame support of a transmission solenoid module assembly disposed in a transmission oil sump wherein the assembly includes a multiple (five shown) individual fluid pressure control solenoid valves and an individual transmission oil temperature sensor packaged on the lead-frame support and wherein each sensor is shown disposed in an oil passage adjacent and communicated to an exhaust output fluid flow port the adjacent of a respective one of the individual solenoid valves to provide oil temperature input information to a transmission electronic control unit.

FIG. 1 provides a schematic view of a first side S1 of a lead-frame support PCB of a solenoid module assembly 10 having multiple (five shown) individual fluid pressure control solenoid valves PCS disposed on the opposite second side of the lead-frame support and having an individual transmission oil temperature sensor T disposed on the first side of the lead-frame support in an oil passage OF adjacent downstream and communicated to a exhaust output fluid flow port EP of a respective one of the individual solenoid valves PCS to provide oil temperature input to a transmission electronic control unit ETCU. The ETCU is disposed directly on the first side S1 or on the opposite second side of the lead-frame support, or can be separately mounted therefrom (e.g. mounted on the transmission housing). The oil passage OF is formed in the lead-frame support PCB adjacent the exhaust port of a respective solenoid valve PCS such that the oil passage OF communicates to the transmission oil sump.

Figure 2:
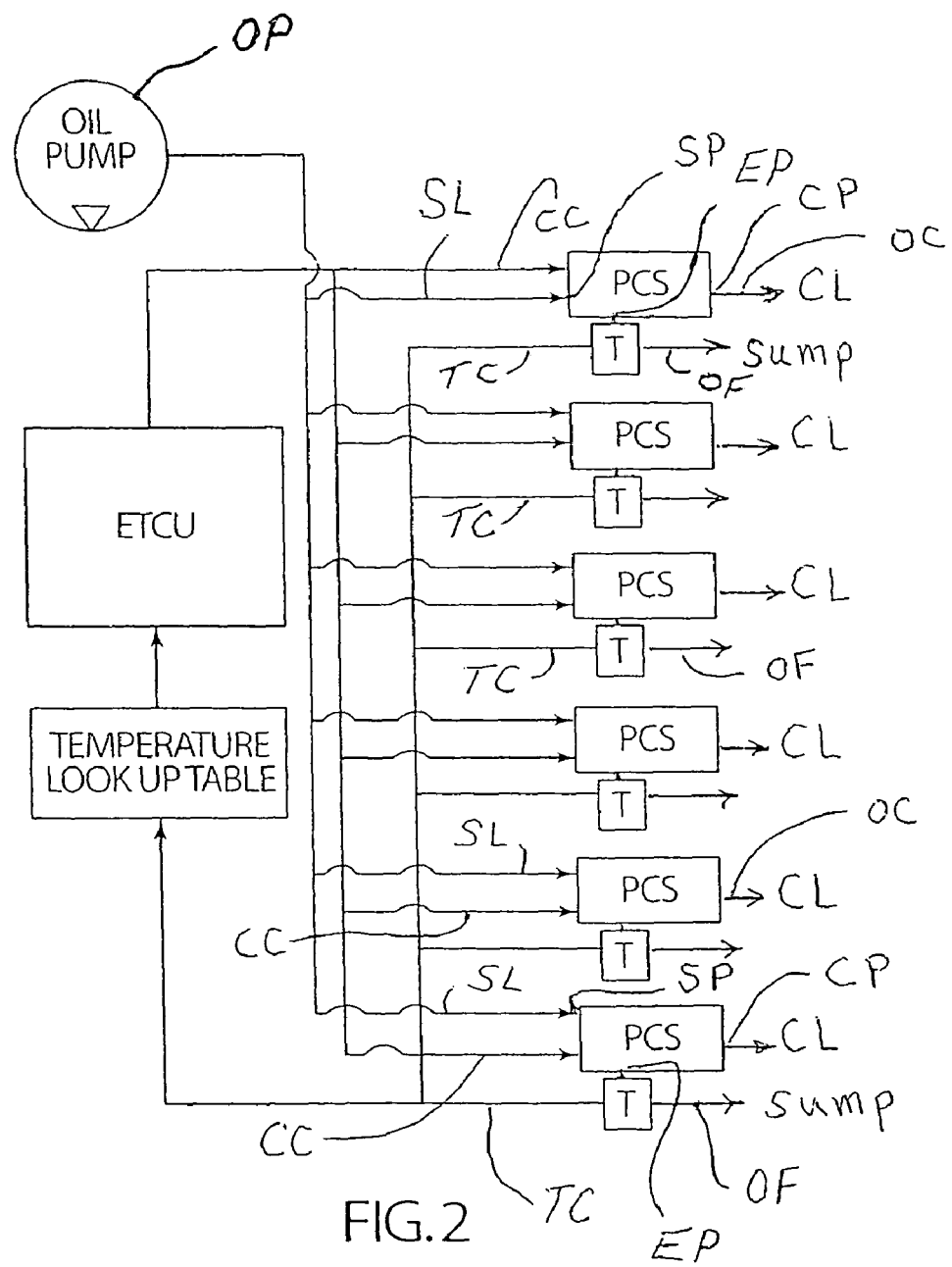
FIG. 2 is a schematic diagram of the solenoid module assembly having multiple (six shown) individual fluid pressure control solenoid valves and showing the fluid pressure control circuit and the solenoid valve electronic control circuit that uses transmission oil temperature information input to a look-up table of the transmission electronic control unit.

Referring to FIG. 2, each solenoid valve PCS includes a supply port SP connected to a conventional transmission oil pump OP and exhaust output fluid flow port EP and a control output fluid flow port CP that is connected to an individual clutch CL of the automatic transmission in conventional manner to control operation (e.g. shift point) of the particular clutch. The oil pump OP can be disposed on the transmission housing or elsewhere to provide oil pressure via supply line SL to the solenoid module assembly 10.

Each solenoid valve PCS also includes an electrical connection CC that is connected to conventional electronic transmission control unit ETCU, such as a microprocessor control unit, that controls the solenoid electrical current via duty cycle, or other operating parameter, of each individual solenoid valve to control the flow/pressure output at the respective control port CP of that solenoid valve in a manner to control clutch action (e.g. to selectively engage or disengage clutches) of the automatic transmission. U.S. Pat. No. 6,695,748 describes a transmission control module for controlling a transmission in such manner and is incorporated herein by reference to illustrate a transmission control module and transmission components with it interfaces.

The ETCU comprises a microprocessor that includes a pressure control algorithm in software stored in memory and that provides command signals to the individual solenoid valves PCS to control clutch action of the automatic transmission in conventional manner. For example, when a particular clutch action of one of the clutches is desired, the ETCU sends a fluid pressure command to a particular one of the individual solenoid valves PCS to control clutch action. In FIG. 2, the ETCU sends the fluid pressure command signal via connection CC to one of the six (6) solenoid valves PCS to actuate clutch action at one of the six (6) clutches CL, which provide for six (6) shifts points of the automatic transmission. The ETCU includes a pressure control algorithm that uses transmission oil temperature as a primary input to control clutch action strategy across all modeled operating temperatures, either a series of look-up tables or as a system model, to derive the output pressure of the solenoid valves PCS needed to achieve control of the clutch shift points.

For purposes of illustration and not limitation, the lead-frame support PCB typically comprises a conventional printed circuit board or ceramic hybrid Mylar type flex circuit board that is configured to provide electrical connections, such as connection CC, between the ETCU and the solenoid valves PCS. The lead-frame support can comprise any support member on which the solenoid valves PCS and temperature sensors T are disposed and electrically connected to the ETCU.

The solenoid valves PCS are mounted on the lead-frame support PCB by modular or permanent terminations such as including, but not limited to, mechanical connectors, rivets, solder, welds, and the like, directly to the lead-frame support. The solenoid valves are connected hydraulically to the oil pump OP by a conventional hydraulic manifold (not shown) employing worm trail and/or conduits and to the respective clutch CL by conventional transmission valve bodies or transfer plates (not shown) of the type illustrated in U.S. Pat. No. 6,695,748.

Each temperature sensor T is attached to the lead-frame support PCB so that the sensor resides in the oil passage OF that is adjacent downstream of and communicated to a respective exhaust output fluid flow port EP of a respective solenoid valve PCS, FIG. 1, to receive exhausted transmission oil therefrom. For purposes of illustration and not limitation, sensor T can comprise a thermistor t disposed on a copper sensor wire w. In this illustrative embodiment, the transmission oil discharged from each exhaust port EP flows over the thermistor t such that the temperature of the exhausted transmission oil can be directly measured by the thermistor, preferably at a location as close as possible to the output flow port of each solenoid valve. To this end, the invention envisions disposing the temperature sensor in the output flow port itself. The oil passage OF can have the polygonal shape shown or any other shape such as a circular or oval shape. The thermistors can comprise model RTH42 thermistors commercially available from Omega USA. Each thermistor can be attached to the lead-frame support PCB by mechanical crimping or forming, soldering, adhesive, or any other attachment method. In lieu of the thermistors described above, the temperature sensors T alternately can comprise thermocouples or other conventional thermal sensors.

The temperature sensor T can be disposed inside the oil passage OF as shown, or external of the respective oil passage OF, such as on an oil tube or conduit, in thermal conduction manner that permits the sensor to indirectly determine temperature of the transmission oil of a respective one of the solenoid valves PCS. Moreover, the temperature sensor can be disposed on the lead-frame support PCB to reside in an oil passage OC that is adjacent and communicated to a respective control output fluid flow port CP of a respective solenoid valve PCS to receive control fluid therefrom.

Each temperature sensor T includes an electrical connection TC that is connected to ETCU to provide respective fluid temperature input information thereto associated with a respective one of the solenoid valves PCS.

The fluid pressure control solenoid valves PCS can comprise variable bleed solenoid (VBS) valves having an exhaust port communicated to sump of the type described in U.S. Pat. No. 5,845,667, which is incorporated herein by reference or as described in copending patent application Ser. No. 11/314,977 of common assignee herewith. The invention is not limited to practice using VBS valves and can be practiced using other type of fluid pressure control valves.

The bulkhead connector shown in FIG. 1 is provided for the purpose of providing electrical connections to the vehicle including, but not limited to, system power (e.g. 12V), chassis ground, and communications (e.g. C.A.N. network).

In operation, the ETCU reads a solenoid-specific transmission oil temperature input (based on the solenoid-specific thermistor), which is sent to a temperature lookup table (temp_lookup table) of the ETCU to calculate a highly accurate electrical current command that is sent to that particular solenoid valve, FIG. 2. The temp_lookup table has solenoid-specific transmission oil temperature (based on the solenoid-specific thermistor) as the input and has a solenoid-specific electrical current command as its output. Thus, in practice of the illustrative embodiment of the invention, the command signal from the ETCU to an individual solenoid valve PCS is derived in response to the transmission oil temperature input signal from a particular individual sensor T associated with a particular individual solenoid valve PCS to achieve more accurate pressure control by that solenoid valve PCS.

In FIG. 1, the module assembly 10 is illustrated disposed in a conventional transmission oil sump SP in a manner that the sump oil level L varies relative to the lead-frame support PCB and the solenoid valves PCS disposed at different locations or heights in the sump. The module assembly can be disposed in a module housing (not shown) in conventional manner. The oil level L can vary in response to transmission oil temperature where a greater oil temperature raises the oil level L relative to the lead-frame and lower oil temperature lowers the oil level L relative to the lead-frame. These conditions of varying oil sump level and different location/height of the solenoid valves PCS, as well as different solenoid duty cycles among the solenoid valves PCS in dependence on the transmission clutch which is operated, can cause varying thermal losses (convection) and subsequent changing and/or varying transmission oil temperatures at the different solenoid valves PCS. Practice of the illustrative embodiment of the invention wherein the command signal from the ETCU to an individual solenoid valve PCS is derived in response to the individual oil temperature input signal from the individual sensor T associated with that particular individual solenoid valve PCS thereby ameliorates these conditions and achieves more accurate pressure control by each solenoid valve PCS.

Practice of the invention thus desensitizes pressure control from time-varying oil levels and thermal changes by accurately modeling fluid temperature inputs from each fluid control solenoid valve, whereby the individual temperature sensors compensate for varying fluid temperature differences among the solenoid valves. Practice of the invention provides better predictability of solenoid fluid temperatures and thus achievement of more accurate pressure control by the fluid solenoids.

Although the invention has been described in connection with certain illustrative embodiments, those skilled in the art will appreciate that changes, modifications and the like can be made thereto within the scope of the invention as set forth in the appended claims.

We claim:

1. An assembly, comprising multiple individual fluid pressure control solenoid valves disposed on a support member wherein the support member includes a respective fluid passage associated with a respective one of the individual fluid control solenoid valves and wherein an individual fluid temperature sensor is so disposed on the support member relative to each respective fluid passage as to permit individual fluid temperature measurement for the respective one of the individual solenoid valves.

2. The assembly of claim 1 wherein the individual fluid temperature sensor is disposed in the fluid passage that communicates to a fluid flow output port of the respective one of the individual solenoid valves so that fluid flows over the sensor.

3. The assembly of claim 1 wherein the individual fluid temperature sensor is disposed in the fluid passage that communicates to an exhaust port or a control port of the respective one of the individual solenoid valves.

4. The assembly of claim 1 wherein the fluid control solenoid valves comprise variable bleed solenoid valves.

5. The assembly of claim 1 wherein the temperature sensor comprises a thermistor.

6. The assembly of claim 1 including an electronic control unit that is disposed on the support member and that provides a command signal to the respective one of the individual solenoid valves in response to the fluid temperature information associated with that individual solenoid valve.

7. A transmission control module assembly, comprising a lead-frame support having multiple individual transmission oil pressure control solenoid valves and an individual transmission oil temperature sensor so disposed on the lead-frame support relative to a respective one of the individual solenoid valves as to permit individual transmission oil temperature measurement for the respective one of the individual solenoid valves.

8. The assembly of claim 7 wherein the individual temperature sensor is disposed in a transmission oil passage that is disposed in the lead-frame support and that communicates to an output port of the respective one of the individual solenoid valves so that fluid flows over the sensor.

9. The assembly of claim 8 wherein the individual fluid temperature sensor is disposed in the transmission oil passage that is adjacent downstream of and communicates to an exhaust port or a control port of the respective one of the individual solenoid valves.

10. The assembly of claim 7 including a transmission electronic control unit that provides a command signal to the respective one of the individual solenoid valves in response to the transmission oil temperature information associated with that individual solenoid valve.

11. A fluid pressure control module assembly, comprising a support member having multiple individual oil pressure control solenoid valves disposed thereon and having a respective oil passage associated with a respective one of the individual solenoid valves, and an individual oil temperature sensor so disposed on the support member relative to each respective oil passage as to permit oil temperature measurement for the respective one of the individual solenoid valves.

12. The assembly of claim 11 wherein the individual temperature sensor is disposed in the respective oil passage that communicates to an output port of the respective one of the individual solenoid valves so that fluid flows over the sensor.

13. The assembly of claim 12 wherein the output port comprises an exhaust port or a control port of the respective one of the individual solenoid valves.

14. The assembly of claim 11 including an electronic control unit that is disposed on the support member and that provides a command signal to the respective one of the individual solenoid valves in response to the transmission oil temperature information associated with that individual solenoid valve.

* * * * *